United States Patent
Ishikawa

(10) Patent No.: US 7,453,485 B2
(45) Date of Patent: Nov. 18, 2008

(54) IMAGE WRITING APPARATUS FOR CONTROLLING TRANSFER OF IMAGE DATA

(75) Inventor: Naoichi Ishikawa, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 257 days.

(21) Appl. No.: 11/202,166

(22) Filed: Aug. 12, 2005

(65) Prior Publication Data

US 2006/0044386 A1 Mar. 2, 2006

(30) Foreign Application Priority Data

Aug. 24, 2004 (JP) ............................. 2004-244483

(51) Int. Cl.
*B41J 2/435* (2006.01)
*B41J 2/47* (2006.01)

(52) U.S. Cl. ........................................ 347/237; 347/247

(58) Field of Classification Search ................ 347/131, 347/234–238, 240, 251–254, 116, 229, 246–250, 347/128, 130; 257/88
See application file for complete search history.

(56) References Cited

U.S. PATENT DOCUMENTS

| | | | | |
|---|---|---|---|---|
| 4,734,714 A | * | 3/1988 | Takasu et al. | ................ 347/237 |
| 5,258,629 A | * | 11/1993 | Itoh et al. | ...................... 257/88 |
| 5,825,400 A | | 10/1998 | Florence | |
| 6,022,155 A | | 2/2000 | Norio | |
| 6,088,050 A | * | 7/2000 | Ng | ............................... 347/237 |
| 6,137,518 A | * | 10/2000 | Maeda | ........................ 347/131 |
| 6,765,235 B2 | * | 7/2004 | Taninaka et al. | ............... 257/88 |
| 2005/0117133 A1 | | 6/2005 | Ishikawa | |
| 2006/0044386 A1 | | 3/2006 | Ishikawa | |

FOREIGN PATENT DOCUMENTS

| | | |
|---|---|---|
| DE | 3843645 | 7/1989 |
| EP | 0466478 | 1/1992 |
| JP | 62227771 A * | 10/1987 |
| JP | 3568001 | 6/2004 |

OTHER PUBLICATIONS

U.S. Appl. No. 11/275,940, filed Feb. 6, 2006, Ishikawa.
U.S. Appl. No. 11/456,269, filed Jul. 10, 2006, Ishikawa.

* cited by examiner

*Primary Examiner*—Hai C Pham
(74) *Attorney, Agent, or Firm*—Oblon, Spivak, McClelland, Maier & Neustadt, P.C.

(57) ABSTRACT

A light-emitting-element array unit includes a plurality of light-emitting-element arrays in which a plurality of light-emitting elements that is controlled based on binary image data is arranged in a row. An image-data-transfer control unit divides image data corresponding to one line in a main scanning direction for each of the light-emitting-element arrays, and when transferring the image data divided to each of the light-emitting-element arrays, controls a transfer of the image data by repeating a process of alternately transferring even pixel data and odd pixel data in one cycle of the one line in the main scanning direction.

5 Claims, 7 Drawing Sheets

IMAGE WRITING APPARATUS FOR CONTROLLING TRANSFER OF IMAGE DATA

CROSS-REFERENCE TO RELATED APPLICATIONS

The present document incorporates by reference the entire contents of Japanese priority document, 2004-244483 filed in Japan on Aug. 24, 2004.

BACKGROUND OF THE INVENTION

1. Field of the Invention

The present invention relates to an optical writing unit in which a light-emitting-element array such as a light-emitting-diode (LED) array is used, and an image writing apparatus that includes the optical writing unit, and more particularly, to an image writing apparatus that enables to print a line image of inclined lines with fidelity, and to achieve further improvement in an aspect ratio of an image.

2. Description of the Related Art

Generally, a laser scanning method by laser beam is used in an image writing apparatus that writes a latent image by irradiating light on a photosensitive drum. A light-emitting-element array method in which LEDs are used in an array form, is one of the LD scanning methods.

In the light-emitting-element array method, when a binary image is output from an image forming apparatus, according to process conditions, a one-dot print is printed in an elliptical form that is wide horizontally. If it is a lattice image of one dot (an image at 5 mm interval), it appears more clearly, and a vertical line is printed thicker than a horizontal line and an aspect ratio becomes a problem.

To solve this problem, there is a method of controlling by using balance-correction data of an LED. In other words, gradation data for each LED, data that corrects output unevenness in units of a blocks that include a plurality of LEDs, and data that corrects output unevenness with respect to output unevenness for an average value of blocks are added together, and an attempt is made to suppress the unevenness of LED by data that is added. However, this method is for multi-valued data and a control method for reproducing with fidelity the gradation by adding data of a binary image and correction data of each LED, is available as a method in binary. However, since printing power (print drive current control) is adjusted, there is an improvement in a line image, but there is no improvement in vertical and horizontal line width. Moreover, according to the LED light-emitting-element array, there are some in which a method of adding the correction data and print image data are added, is not used.

In view of this, in a conventional LED light-emitting-element array, the control is performed by allowing lighting up for a number of times. However, in a light-emitting-element array unit that transfers odd pixel data upon transferring even pixel data from image data, it lights up twice for one image transfer.

As a conventional technology, according to Japanese Patent. Application Laid-open Publication No. H9-11540, gradation print data upon the unevenness correction is stored in a shift register 12, and bit sliced data is fetched by using a shift register 22 and AND gates A1 to A5. In synchronization with this, a reference current is changed by changing reference resistances R1 to R5 by a shift register 24 and switches S1 to S5.

According to the conventional method, it is possible to thicken width of the horizontal line and to improve the aspect ratio, but since there is a difference in even pixels and odd pixels in a line, a line image of an inclined line is serrated.

SUMMARY OF THE INVENTION

It is an object of the present invention to at least solve the problems in the conventional technology.

An image writing apparatus according to one aspect of the present invention includes a light-emitting-element array unit that includes a plurality of light-emitting-element arrays in which a plurality of light-emitting elements that is controlled based on binary image data is arranged in a row; and an image-data-transfer control unit that divides image data corresponding to one line in a main scanning direction for each of the light-emitting-element arrays, and when transferring the image data divided to each of the light-emitting-element arrays, controls a transfer of the image data by repeating a process of alternately transferring even pixel data and odd pixel data in one cycle of the one line in the main scanning direction.

An image writing apparatus according to another aspect of the present invention includes a light-emitting-element array unit that includes a plurality of light-emitting-element arrays in which a plurality of light-emitting elements that is controlled based on binary image data is arranged in a row; and an image-data-transfer control unit that divides image data corresponding to one line in a main scanning direction for each of the light-emitting-element arrays, and when transferring the image data divided to each of the light-emitting-element arrays, controls the transfer of the image data such that, in a first output mode, by repeating a process of alternately transferring even pixel data and odd pixel data in one cycle of the one line in the main scanning direction, and in a second output mode, by performing once a process of alternately transferring even pixel data and odd pixel data in one cycle of the one line in the main scanning direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described below with reference to the accompanying diagrams.

Figure 1:
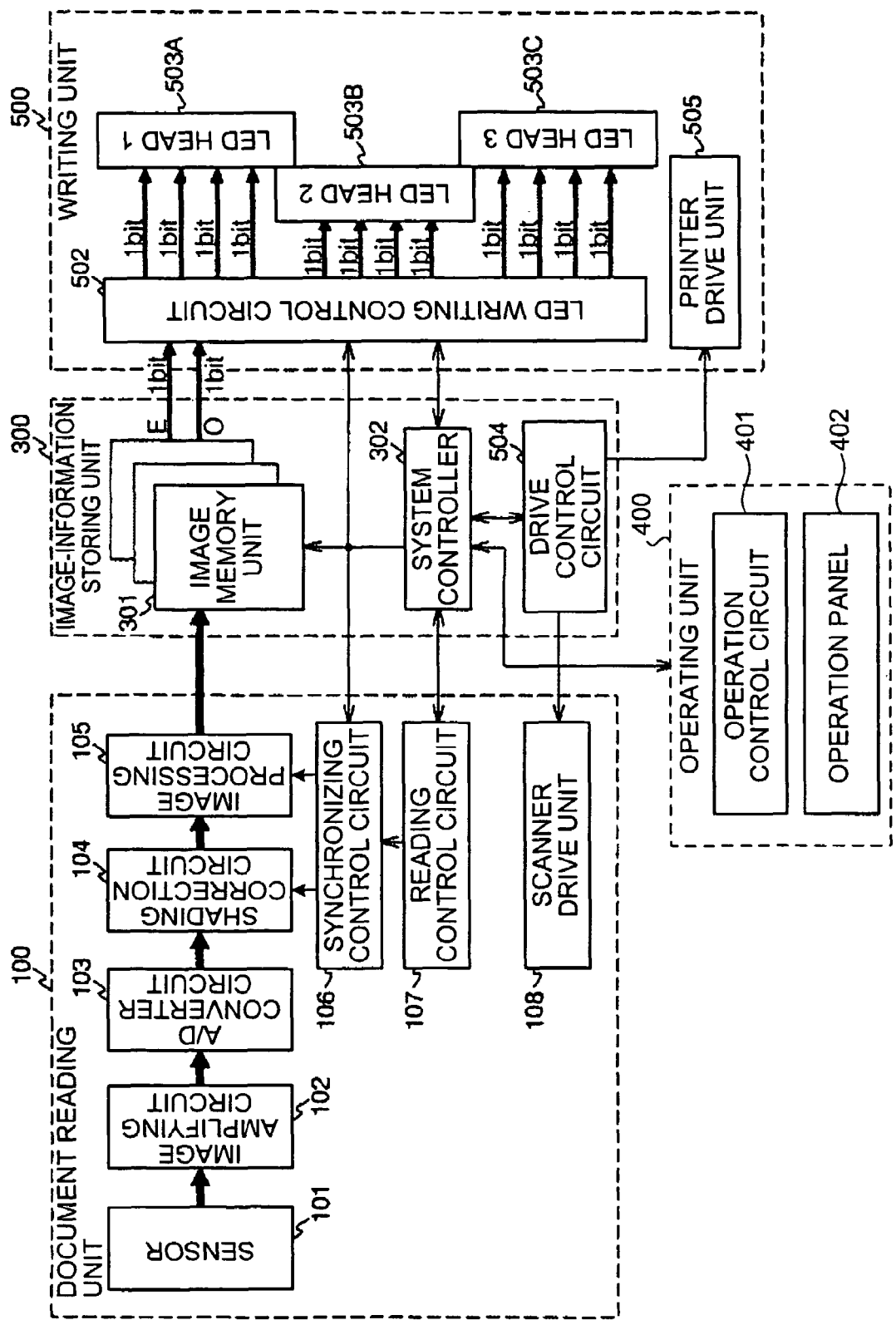
FIG. 1 is a block diagram of a digital copying machine according to an embodiment of the present invention.
Figure 2:
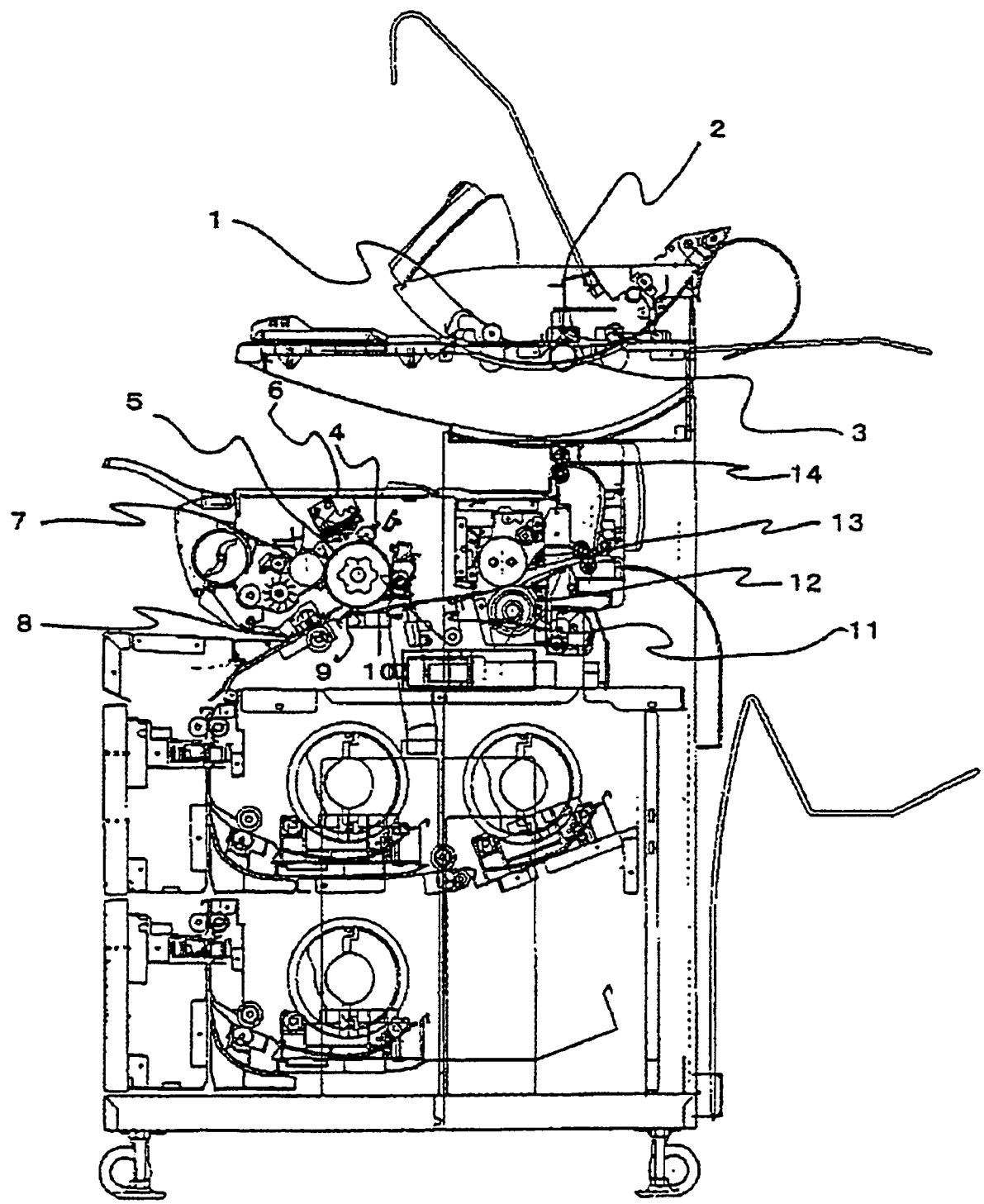
FIG. 2 is a side view of a structure of the digital copying machine shown in FIG. 1.

FIG. 1 is a block diagram of a digital copying machine according to an embodiment of the present invention. FIG. 2 is a side view of a structure of the digital copying machine shown in FIG. 1.

As shown in FIG. 1, the digital copying machine (image writing apparatus) includes a document reading unit 100 that reads a document, an image-information storing unit 300 that stores the document read, a writing unit 500 that copies the information stored on a transfer paper, a system controller 302 that performs execution control of a series of processes, and an operating unit 400 that performs key input to the system controller 302.

When an operator inserts a document from an insertion slot, the document is carried between a contact sensor 2 and a white roller 3 according to rotation of a roller 1 shown in FIG. 2. While the document is being carried, light from an LED that is fixed to the contact sensor 2 is irradiated on the document. The reflected light forms an image on the contact sensor 2 and document-image information is read.

The document image that is formed on the contact sensor 2 is converted into an electric signal and this analog signal is amplified by an image amplifying circuit 102. An analog-to-digital (A/D) converter circuit 103 converts the analog image signal that is amplified by the image amplifying circuit 102 to a multi-valued digital image signal for each pixel. The digital image signal converted is output in synchronization with a clock that is output from a synchronizing control circuit 106 and a distortion due to unevenness in quantity of light, dirt on a contact glass, and unevenness in sensitivity of sensor are corrected by a shading correction circuit 104. The digital image information that is corrected is subjected to image processing at an image-processing circuit 105 and then converted into digital recording image information. The digital recording image information is written in an image memory unit 301, thereby performing the writing process.

The system controller 302 has a function of performing the overall control. The system controller 302 controls scanner drive unit 108 and a printer drive unit 505 via a reading control circuit 107, the synchronizing control circuit 106, the image memory unit 301, the LED writing control circuit 502, and the drive control circuit 504, and controls reading of a document, storing of document data that is read, and writing of the document stored on the transfer paper.

In the writing unit 500, an image signal that is transferred from the image memory unit 301 by the synchronized signal clock is converted into a one-pixel unit bit at the LED writing control circuit 502, then converted into an infrared signal at an LPH 503, and then output.

A charging unit 4 is a scortoron charger with a grid that charges a photosensitive drum 5 uniformly to −1200 V. A light-emitting-element array unit 6 includes LEDs arranged in the form of an array and the LED light is irradiated on the photosensitive drum 5 via an SLA (SELFOC Lens Array).

In this case, the light-emitting-element array unit 6 shown in FIG. 2 includes a plurality of light-emitting-element arrays (LED heads 1 to 3: 503 in FIGS. 1 and 3) with each light-emitting-element array having a plurality of light-emitting elements installed in a row in one direction that are subjected to light emission control according to binary image data, and an image forming unit that forms an image of the light emitted by the light-emitting-element arrays on the photosensitive drum 5. The plurality of light-emitting elements arrays (LED heads 1 to 3: 503) is arranged in a staggered form such that when an axial direction of the photosensitive drum 5 is let to be the main scanning direction, the plurality of light-emitting-element arrays move by a predetermined amount in a secondary scanning direction as well as overlap by a predetermined amount in the main scanning direction.

When the LED light based on the digital image information is irradiated on the photosensitive drum 5, charge on a surface of the photosensitive drum 5 flows to the earth and eliminated due to a phenomenon of photoconductivity. A light portion of the document is let not to cause LED to emit light and a dark portion of the document is let to cause LED to emit light. By this, an electrostatic latent image according to shades of the image is formed on a portion of the photosensitive drum 5 that is not irradiated by the LED light. This electrostatic latent image is developed by a developing unit 7. Since toner in the developing unit is charged with a negative polarity due to stirring and a bias of −700V is applied on it, the toner is adhered only to a part that is irradiated by the LED.

On the other hand, a transfer paper is selected from three paper feeding trays and bypasses, and is passed to a lower part of the photosensitive drum 5 at a predetermined timing by a registering roller 8. While the paper is passed, a toner image is transferred to the recording paper by a transfer charger 9. The recording paper is then separated from the photosensitive drum 5 by a separating charger 10 and then carried to a fixing unit 12 by a carrier tank 11. In the fixing unit 12 the toner is fixed to the recording paper. The recording paper with the toner fixed on it is discharged to a front or a back side of the machine by a paper discharging tray 14 or 13.

Regarding the flow of the image signal, binary image data of odd pixels (ODD) and even pixels (EVEN) is sent simultaneously with a transfer speed 16 MHz from the image memory unit 301 to the LED writing control circuit 502. The image signal with the two pixels sent in parallel is once merged into one line, then divided into three and allocated to LED heads 503A, 503B, and 503C, thereby transferring four pixels simultaneously.

Figure 3:
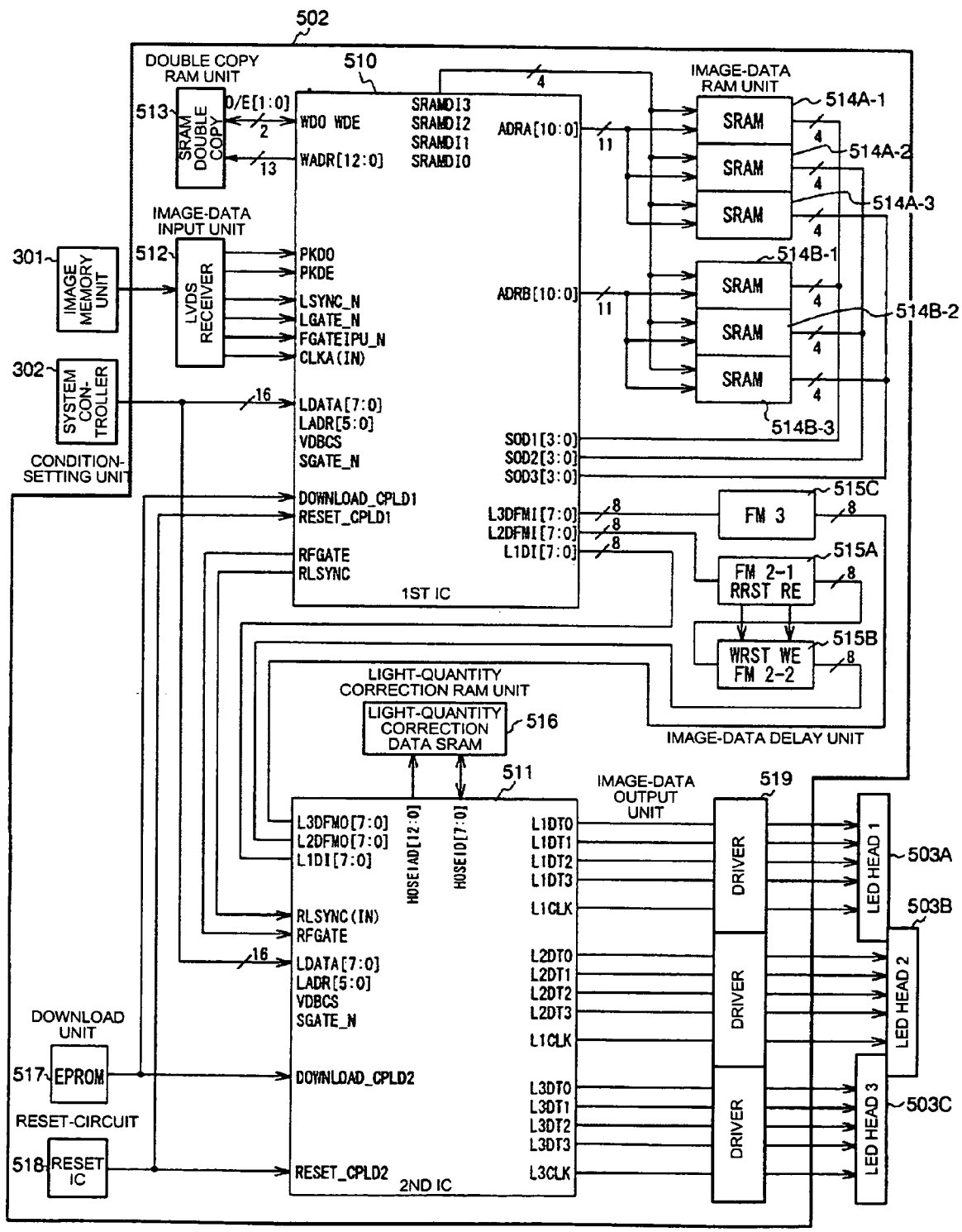
FIG. 3 is a block diagram of an LED writing control circuit shown in FIG. 2.

FIG. 3 is a block diagram of the LED writing control circuit shown in FIG. 2. The binary image signal, the odd pixel (ODD), the even pixel (EVEN), and a timing signal are converted from parallel into serial by using a low-Voltage-differential-signaling (LVDS) receiver 512 that is a low-voltage operative signal element by the image memory unit 301 (since they are sent to the LED writing control circuit 502 at 16 MHz, they are converted from the serial signal into the parallel signal), and are input to a first IC 510 as PKDE, PKDO, CLKA, LSYNC_N, LGATE_N, and FGATEIPU_N. The LSYNC_N and FGATEIPU_N of the timing signal are allowed to be synchronized with an internal clock in the first IC 510, let to be delayed by an amount of the processing time of image signal, and then input to a second IC 511 as RLSYNC and RFGATE.

The image signals of the odd pixels (ODD) and the even pixels (EVEN) that are input to the first IC 510 are let to be 4 pixel units and are stored as SRAMDI (3.0) at a transfer speed 8 MHz in the three A group SRAMs (514A-1 to 514A-3) and in three B group SRAMs (514B-1 to 514B-3) by an SRAM address signal ADRA (10.0) and ADRB (10.0).

The LED heads 503A to 503C have 23040 dots (A3 width 7680d×3) and since the image-signal transfer is divided into three parts, an image signal for one main scanning line is stored in the SRAM 514A of a group A. In other words, the image signal of the LED head 503A is stored in the SRAM 514A-1, the image signal of the LED head 503B is stored in the SRAM 514A-2, and the image signal of the LED head 503C is stored in the SRAM 514A-3.

The image signals that are stored one by one in the three SRAMs 514A-1 to 514A-3 of the group A at 8 MHz are read simultaneously from the three SRAM of the group A (514A-1 to 514A-3), then input once again to the first IC 510, and converted further.

In this case, in reading from the SRAM 14, it is read twice in the width of the one main scanning line. In the first reading, only the odd-pixel image data is fetched and is converted to 8 pixel units, in the second reading, the even-pixel image data is fetched and is converted to 8 pixel units, and sent to field memories 515A to 515C of the an image-data delay memory unit at the transfer speed 2 MHz.

At this time, the image data of the LED head 503A is transferred as it is, to the second IC 511, the image data of the LED head 503B is transferred to the field memory 515A, and the image data of the LED head 503C is transferred to the field memory 515C.

While performing the reading control from the first line SRAM, for the next line, the image signals are stored in the three SRAMs 514B-1 to 514B-3 of the group B similarly as of the group A.

The reading and writing operations are performed by allowing the three SRAMs 514A-1 to 514A-3 of the group A and the three SRAMS 514B-1 to 514B-3 of the group B to perform a toggle operation to thicken the line.

Regarding the image-signal delay units 515A and 515B of the LED head 503B, since three LED heads 515A to 515C of A3 width are arranged in a staggered form, with the LED head 503A as a reference, the LED head 503B is installed 17.5 mm away from the secondary scanning direction on a mechanical layout.

Therefore, when the image signals that are output from the three SRAMs 514A-1 to 514A-3 of the group A and from the three SRAMs 514B-1 to 514B-3 of the group B are processed simultaneously and transferred to the LED head 503B, the LED head 503B prints 17.5 mm away (17.5 mm/42.3 m (1 dot of 600 dpi)=416 lines) with respect to the LED head 503A.

To correct this mechanical shift, the image signals of the LED head 503B that are output from the SRAM 514A-2 of the group A and the SRAM 514B-2 of the group B at 8 MHz are written as 180 lines (fixed) at 2 MHz in an order of lines that are transferred to a field memory 515A as 8 pixel units.

Further, as the image signals are written, simultaneously as the image signal from the field memory 515A at 2 MHz is read, 236 lines (variable) are written in a field memory 515B that is cascaded.

The image signals are read from the field memory 515B at 2 MHz in an order as they are written, and are input as L2DFMO (7.0) to the second IC 511. By this, the image signal of the LED head 503B is delayed by 416 lines. Since the number of lines delayed differ according to the accuracy of components of the LED head 503B and unevenness in assembling, it is possible to perform control in units of one line (42.3 μm).

Regarding the delay of the image data of the LED head 503C, since the LED heads 503A to 503C of width A3 are arranged in the staggered form, with the LED head 503A as a reference, the LED head 503C is installed 0.5 mm away in the secondary scanning direction on the mechanical layout. Therefore, when the image signals that are output from the three SRAMs 14A-1 to 14A-3 of the group A and from the three SRAMs 14B-1 to 14B-3 of the group B are processed simultaneously and transferred to the LED head 503C, the LED head 503C prints 0.5 mm away (0.5 mm/42.3 μm (1 dot of 600 dpi)=12 lines) with respect to the LED head 503A.

To correct this mechanical shift, the image signals of the LED head 503C that are output from the SRAM 14A-3 of the group A and the SRAM 14B-3 of the group B at 8 MHz are written as 12 lines at 2 MHz in an order of lines that are transferred to a field memory 515C as 8 pixel units.

Further, the image signals are read from the field memory 515C at 2 MHz in an order as they are written, and input as L3DFMO (7.0) to the second IC 511. By this, the image signal of the LED head 503C is delayed by 12 lines.

Since the number of lines delayed differ according to the accuracy of components of the LED head 503C and unevenness in assembling, it is possible to perform the control in units of a line (42.3 μm).

Each of the LED heads 503A to 503C includes a light-quantity correction ROM to store correction data for each LED array chip and correction data for each LED element for correcting the variation in the light quantity of each LED element.

As the power is supplied, due to a CPLD control of the first IC 511, first of all, light-quantity correction data of the LED head 503A is read and then subjected to serial/parallel conversion. Further, it is stored as correction data HOSEID (7.0) with an address in eight-bit units in the light-quantity correction SRAM unit 516. After the entire data is stored, it is read from the light-quantity correction SRAM 516 and then transferred once again to the LED head 503A. This operation is performed for the LED heads 503B and 503C.

The light-quantity correction data that is transferred is held as correction data in the LED heads 503A to 503C.

In this case, a function that enables to print and copy twice and side by side on a paper an image up to maximum 420 mm (A2 portrait size) in the main scanning direction, and doubles the productivity of the printer is made available.

While making a double copy, a binary image signal (E, O) is transferred to the LED writing control circuit 502 at less than or equal to half of LSYNC_N. By using this, it is structured such that a dubbing operation of the image signal in one LSYNC_N is performed. The image signal (E, O) sent from the image memory unit 301 at 16 MHz is output together with an address signal WADR (12.0) to a double-copy SRAM 513 as WDE and WDO from the first IC 510. The image data is stored in this double-copy SRAM 513. At the same time, the data upon conversion into 4 pixel units is stored in the three SRAMs (514A-1 to 514A-3) of the group A, which are the image-data RAM units. At the same time at the end of the image-signal storing from the image memory unit 301, the image data stored in the double-copy SRAM 513 is read and fetched to the first IC 510. This data is converted to 4 pixel units similarly as the image data that is sent from the image memory unit 301 and is caused to be read additionally by the three SRAMs (514A-1 to 514A-3) of the group A.

With this mechanism, one double-copy image main scanning line is stored in the three SRAMs (514A-1 to 514A-3) of the group A. The line is thickened by toggling this operation for the three SRAMs (514A-1 to 514A-3) of the group A and the three SRAMs (514B-1 to 514B-3) of the group B.

The image signals of 8 pixel units of the LED heads 503A to 503C that are input to the first IC 511 are converted into 4 pixel units and are merged into one line. These image signals are output together with a timing signal from the second IC 511 and transferred at 4 MHz to each of the LED heads 503A to 503C via the image-data output unit 519. In this case, L1 to L3 CLK is at 2 MHz and the data at a build up and a trailing edge.

Since the first IC 510 and the second IC 511 are CPLD of SRAM type, by putting the power supply OFF, a writing control program inside the first IC 510 and the second IC 511 is deleted entirely. Therefore, whenever the power supply is ON, every time the download unit (EPROM) 517 downloads (configuration) the program.

When the power supply is put ON, the program is transferred from the EPROM 517 to the first IC 510 in serial-data as DOWNLOAD_CPLD 1, and downloaded. At the same time as the downloading to the first IC 510 ends, the program is transferred from the EPROM 17 to the second IC 511 in serial data as DOWNLOAD_CPLD 2, and downloaded.

When the power supply is put ON, due to a voltage drop in a supply voltage to the LED writing control circuit, system-reset signals RESET_CPLD 1 and RESET_CPLD 2 are output from the reset circuit 518. The system-reset signal RESET_CPLD 1 is input to the first IC 510 and the system-reset signal RESET_CPLD 2 is input to the second IC 511. Based on these, a counter in the first IC 510 and that in the second IC 511 are reset thereby initializing the system.

Writing conditions (such as double copy, writing paper size) are set in the LED writing control circuit 502 by inputting a control signal from the system controller, input-data bus LDATA (7.0), address bus LADR (5.0), latch signal vDBCS, image-transfer signals FGATEIOB_N and SGATE_N to the first IC 510 and the second IC 511.

Figure 4A:
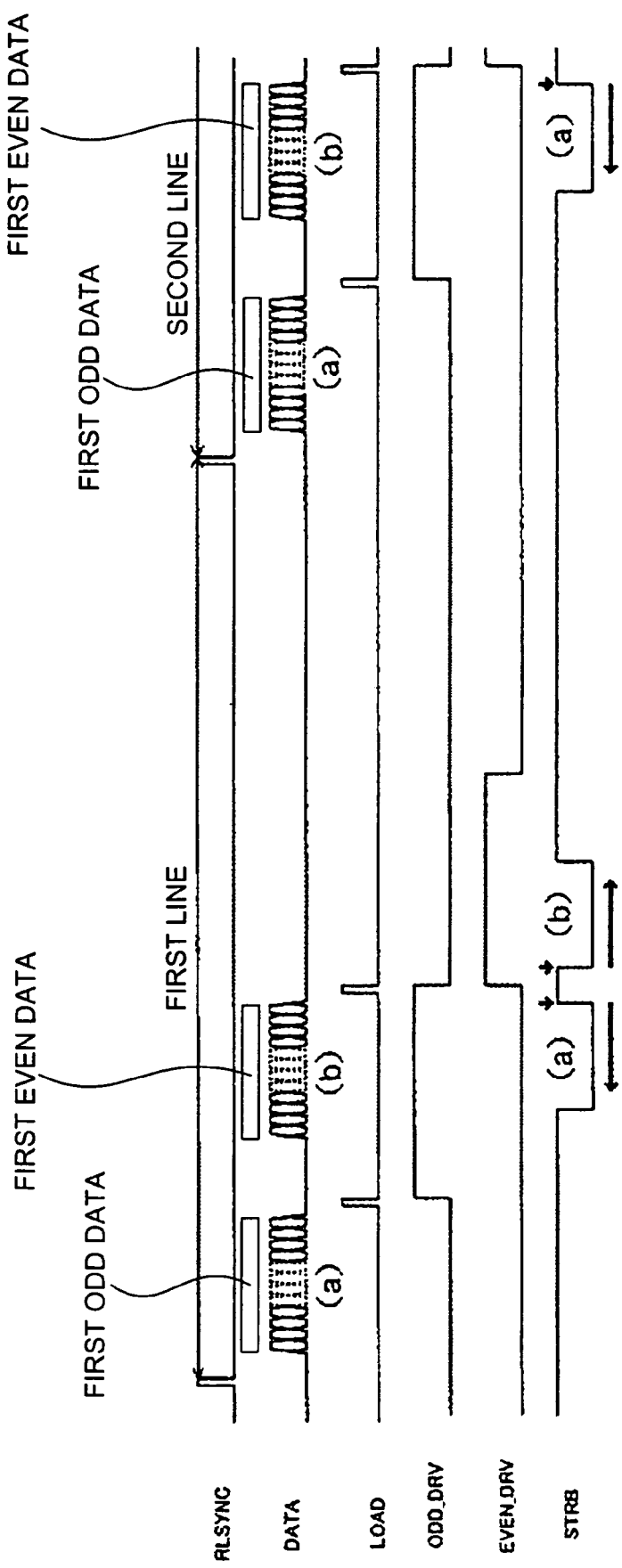
FIGS. 4A and 4B are timing diagrams of a lighting control and a data transfer to an LED head according to the present embodiment.

FIG. 4A is a timing diagram of a lighting control and the data transfer to a normal LED head. As shown in FIG. 4A, RLSYNC is a width of one main scanning line. In this width, a series of processes is performed, and the image data is transferred by building up and trailing of edge. DATA is 4-pixel units image data and for the transfer of the image data, first of all, odd pixel data ODD DATA of 7680 pixel of the LED head 503 is transferred. After transferring, the data is latched by a LOAD signal. Next, even pixel data EVEN DATA is transferred and again latched by the LOAD signal. While the even pixel data EVEN DATA is being transferred, a lighting-enable signal ODD_DRV is enabled and LED is lit for the odd pixel data that is latched by a lighting signal (STRB signal). While the STRB signal is LOW active in a, the LED emits light. After this, the even pixel data as well causes the LED to emit light by an EVEN_DRV signal, and the STRB signal.

Regarding the control of the STRB signal, the lighting of the odd data causes the LED to emit light during LOW period a of the STRB signal and the lighting of the even data causes the LED to emit light during LOW period b of the STRB signal. Since the LED emits light during the LOW period of the STRB signal, the image density can be adjusted. However, the image density is regulated by process conditions etc., and as machine condition, it is nearly 10% of a width of one main scanning line. 10%, from a linear velocity and pixel density, is 705.6 μsec main scanning width and 10% of it i.e. 70.56 μsec is a lighting time.

Figure 4B:
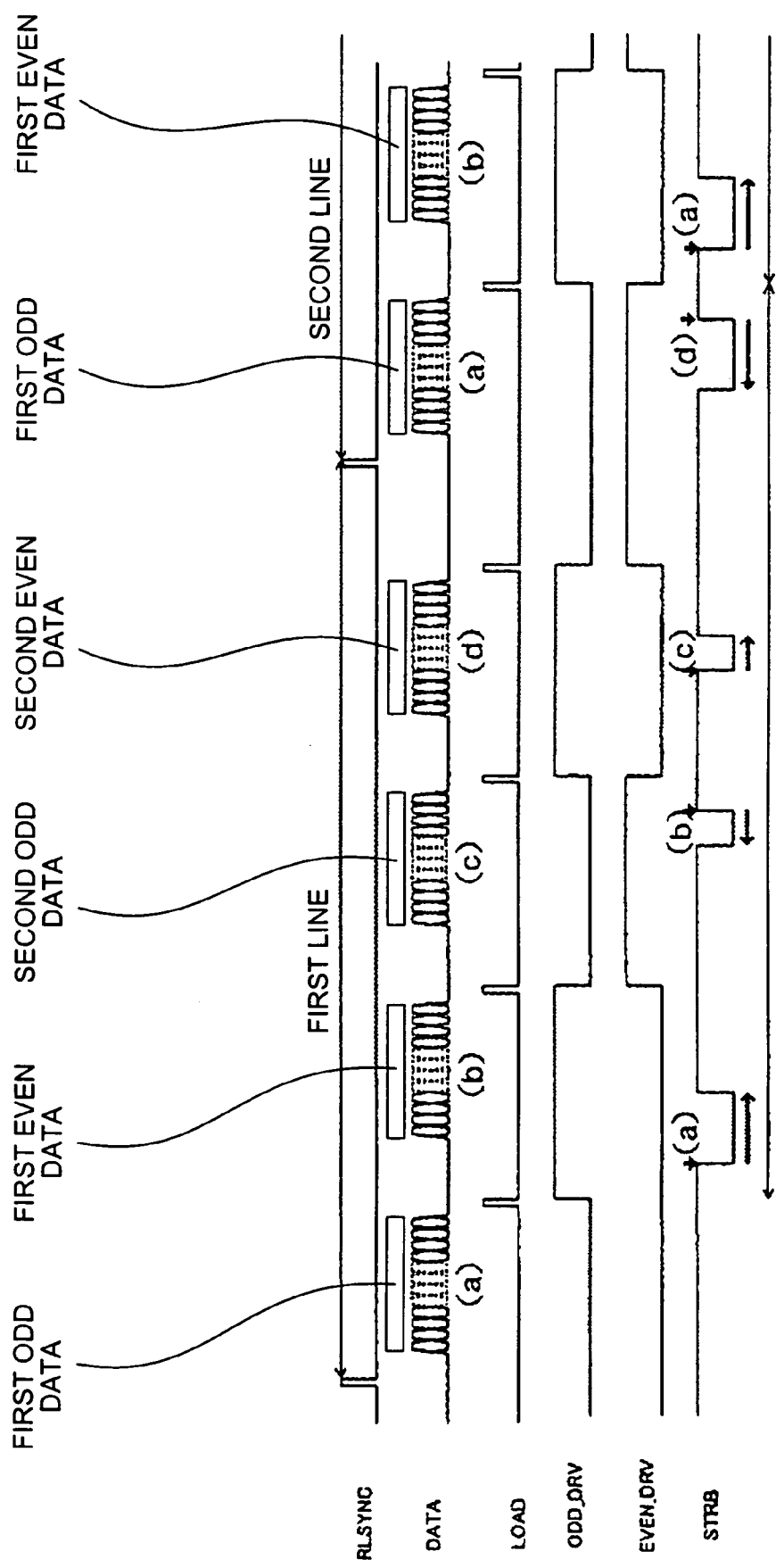

FIG. 4B is a timing diagram of the lighting control and the data transfer to the LED head according to the embodiment of the present invention. As shown in FIG. 4B, RLSYNC is a width of one main scanning line. In this width, a series of processes is performed, and the image data is transferred by building up and trailing of the edge. DATA is 4-pixel units image data and for the transfer of the image data, first of all, odd pixel data ODD DATA of 7680 pixel of the LED head 503 is transferred. After transferring, the data is latched by the LOAD signal. Next, even pixel data EVEN DATA is transferred and again latched by the LOAD signal.

According to the present embodiment, for transferring the image data for one line in one main scanning line width to each light-emitting-element array (LED head 503), the image data is transferred alternately and twice each in the order of odd pixel data and even pixel data and the control is performed such that the number of lightings is four times, i.e. twice each for the odd pixel data and the even pixel data.

In other words, as shown in FIG. 4B, from among intervals a, b, c, and d of the STRB signal, the intervals a and c are STRB signals for the odd pixel data and the intervals b and d are STRB signals for the even pixel data. A period of approximately one main scanning line with one rotation of the photosensitive drum is used effectively and a time interval of LED lighting is long.

In other words, for transferring the image data for one line in one main scanning line width to each light-emitting-element array (LED head 503), an operation of transferring the odd pixel data after transferring the even pixel data is repeated for the number of times (twice in the first embodiment). By this, the control is performed such that the light-emitting-element array unit 6 lights for the number of times the data is transferred (four times in the first embodiment). Therefore, printing by driving the light-emitting-element array in this manner enables to thicken a horizontal line by increasing print density with respect to width of one line and to improve an aspect ratio of one dot.

Moreover, the transfer control is performed such that the transfer of the image data for a multiple number of times is in a maximum control effective range in one main scanning line. Therefore, the lighting control is to the maximum with the lighting frequency for the period of one main scanning line.

The image data is transferred as one even pixel data→two odd pixel data→three even pixel data→four odd pixel data in the cycle of one main scanning line and since one even pixel data is lit while transferring two odd pixel data, the lighting of the four even pixel data is at the time of one even pixel data of the next line. Thus, the maximum cycle of one main scanning line is used.

Further, according to the present embodiment, the transfer control of the image data is performed such that each lighting interval is uniform. In other words, in this case, the lighting interval of the STRB signal four times is let to be uniform, the distortion in the dot diameter is eliminated and the difference between the odd image pixel and the even image pixel is reduced.

Moreover, according to the present embodiment, the lighting time of the first even pixel data and the second odd pixel data in the one main scanning line cycle and the lighting time of the first odd pixel data and the second even pixel data in the one main scanning line cycle is subjected to a ratio control. In other words, in this case, for example, when an interval a in the STRB signal of the even pixel data shown in FIG. 4A is let to be 10% width of the one main scanning line interval, by letting the intervals a and c of the STRB signal shown in FIG. 4B to 10% width by adding the lighting time of the both, it is possible to thicken the horizontal width of one pixel without changing the image density, thereby enabling to improve the aspect ratio (fourth aspect). The same is true for the intervals b and d of the STRB signal. In detail, as shown in the print dot diameter in FIG. 5A, if the two lightings are in a duty interval of the same STRB signal, the density becomes high, thereby affecting the image. Therefore, by adjusting the lighting ratio twice, the unevenness in density is prevented.

Figure 5A:
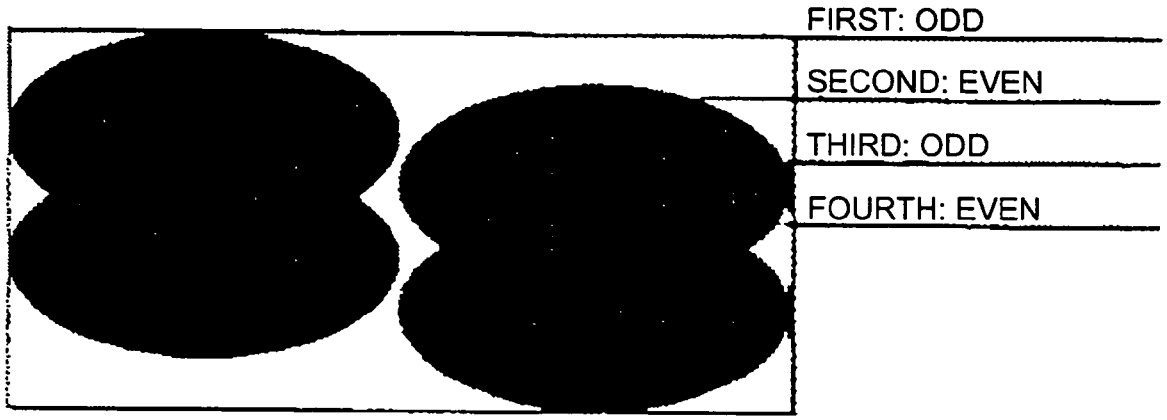
FIGS. 5A and 5B are schematics of an example of a print-dot diameter for showing an image effect by an image-data transfer control according to the present embodiment.
Figure 5B:
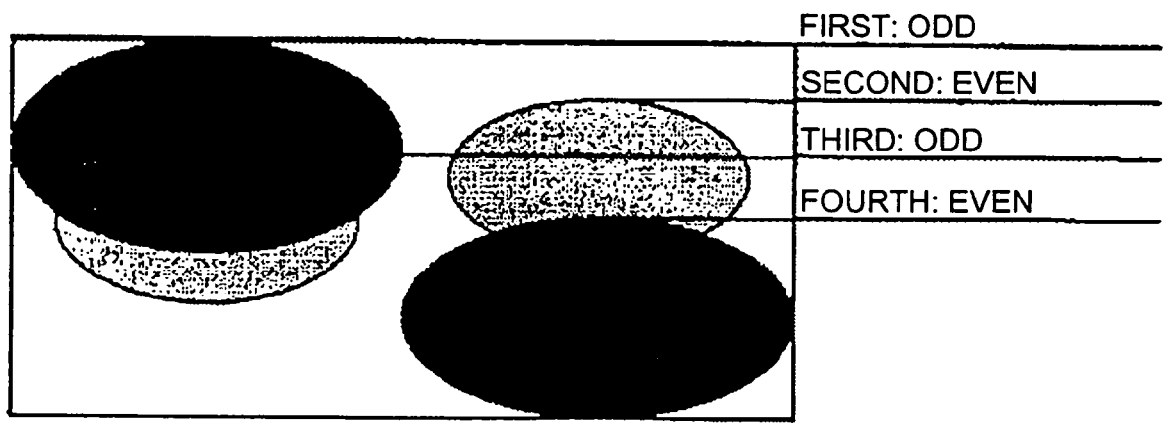

FIGS. 5A and 5B are schematics of an example of the print-dot diameter for showing an image effect by the image data transfer control according to the present embodiment.

The ratio of the intervals a and c of the STRB signal shown in FIG. 4B (the intervals b and d of the STRB signal) is can be controlled automatically. However, in the present application, since the three LED heads are installed in the staggered form and since a lighting DUTY of each LED head differs, when the lighting width of the first LED head is 10%, the lighting width of the second LED head is 9%, and the lighting width of the third LED head is 12%, if the ratio is set to 3:1, the first LED head becomes 7.5% and 2.5%, the second LED head becomes 6.75% and 2.25%, and the third LED becomes 9% and 3%. This eliminates the unevenness in the density of each LED head and leads to the uniform density.

Furthermore, according to the present embodiment, the ratio of the lighting time of the first even pixel and the second even pixel data in the one main scanning line cycle is let to be the same as the ratio of the lighting time of the first odd pixel data and the second odd pixel data in the one main scanning line cycle and the control is performed such that the lighting time of the first even pixel data in the one main scanning line cycle is greater than the lighting time of the second even pixel data in the one main scanning line cycle and the lighting time of the first odd pixel data in the one main scanning line cycle is less than the lighting time of the second odd pixel data in the one main scanning line cycle.

In other words, as shown in FIG. 4B, for example in a case of 10% duty, the STRB signal intervals at the ratio 3:1 of the first LED head are as follows. The intervals a and c of the STRB signal for the odd data are 7/5% and 2.5% respectively, the intervals b and d of the STRB signal for the even data are 2.5% and 7.5% respectively. By letting the lighting time of the intervals a and d of the STRB signals to be longer, an edge portion can be emphasized and can be thickened further in one line.

As shown in the example, regarding the lighting of the print-dot diameter in FIG. 5B, the image-data transfer is, first: odd pixel image data→first: even pixel data→second: odd pixel data→second: even pixel data. Therefore, by alternate lighting of odd and even, and by elongating the printing time of the first odd pixel data and by shortening the printing time of the second odd pixel data, as well as by elongating the printing time of the second even pixel data, an edge effect of the dot can is achieved without increasing the density. Moreover, since the lighting is alternate, the difference between the even pixels can be alleviated.

According to the present embodiment, for transferring the image data for one line in one main scanning line width to each light-emitting-element array, in a case of a first output mode, the image-data transfer control is performed such that an operation of transferring the odd pixel data upon transferring the even pixel data is repeated for a plurality of times. In a case of a second output mode, the image-data transfer control is performed such that an operation of transferring the odd pixel data upon transferring the even pixel data is performed once. In other words, according to an output mode, i.e. a copier mode and a printer mode, in a case of the copier mode (second output mode), as shown in FIG. 4A, for transferring the image data for one line in one main scanning line width to each light-emitting-element array (LED head 503), the image data is transferred once in an order of the odd pixel data and then the even pixel data, and the control is performed such that in each one main scanning line width, the number of lightings is twice viz. the odd pixel data and the even pixel data. When the output mode is a printer mode (first output mode), as shown in FIG. 4B, for transferring the image data for one line in one main scanning line width to each light-emitting-element array (LED head 503), the control is performed such that the image data is transferred alternately and twice each in the order of the odd pixel data and the even pixel data, and for each one main scanning line width, the number of lightings is four times, i.e. twice each for the odd pixel data and the even pixel data.

Moreover, according to the present embodiment, the image-data-transfer control unit, in the case of the first output mode, performs the ratio control of the lighting time of the first even pixel data and the second even pixel data in the one main scanning line cycle and the lighting time of the first odd pixel data and the second odd pixel data in the one main scanning line cycle (seventh aspect). In other words, for the lighting time (Duty ratio) in the copier mode a value that is obtained by calculating the ratio from the duty ratio in the printer mode is divided.

Figure 6A:
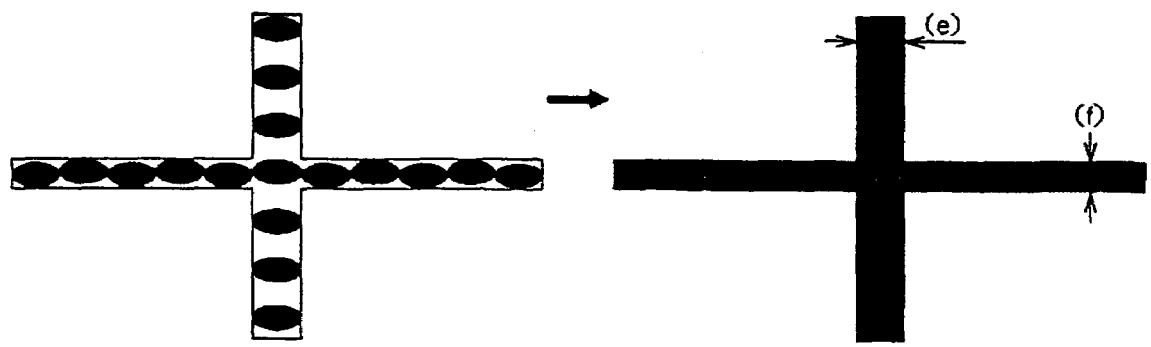
FIGS. 6A and 6B are schematics of the image effect by the image-data transfer control according to the present embodiment.
Figure 6B:
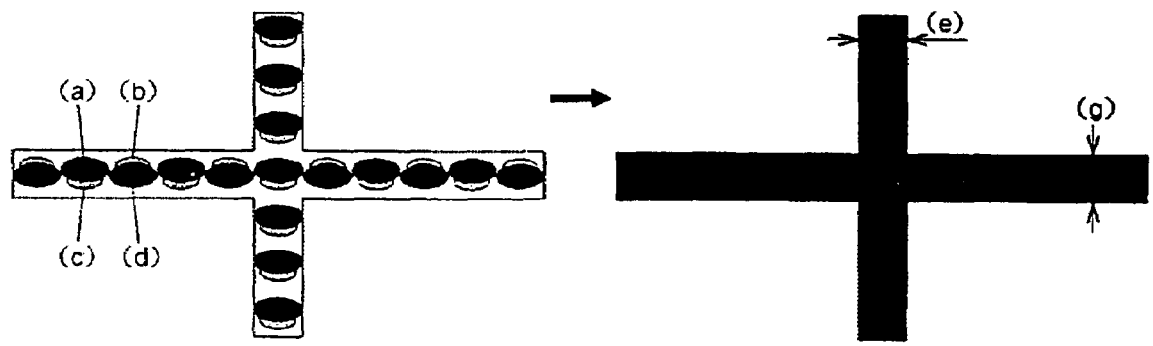

FIGS. 6A and 6B are schematics of the image effect by the image-data transfer control according to the present embodiment. In this case, in the description, each LED head 503 is let to have 7680 pixels and the first pixel is an odd pixel.

Thus, previously, as shown in FIG. 6A, when the lighting used to be once each by transferring the odd and even pixel data once, a horizontal line f was thinner than a vertical line e. However, by lighting twice and continuously by transferring the odd and even pixel data once, the thickening effect of the horizontal line f is more. Further, if the odd pixel data and the even pixel data are transferred upon dividing, it is possible to thicken a horizontal line g as shown in FIG. 6B and to alleviate the difference between the pixels.

According to the present invention, an image-data-transfer control unit repeats for a plurality of times (twice in this example) an operation of transferring image data for one line in one main scanning line width by transferring odd-pixel data upon transferring even-pixel data to each of light-emitting-element array, and performs a transfer control of pixel data so that the number of times of lighting is the same as the number of times of data transfer (four times in this example), and drives the light-emitting-element array. This enables to thicken a horizontal line by increasing print density with respect to width of one line and to improve an aspect ratio of one dot.

Moreover, the transfer of image data for a multiple number of times is in a maximum control effective range in one main scanning line. Moreover, the maximum lighting control is performed for the number of lightings for a cycle of one main scanning line. Therefore, a lighting interval in a plurality of times is widened and it is possible to thicken the horizontal line and to improve the aspect ratio of one dot Furthermore, according to the present invention, by controlling evenly each lighting interval, it is possible to reproduce with fidelity the line image by reducing a difference between the even pixels and the odd pixels, without deforming the dot diameter.

Moreover, according to the present invention, by performing a ratio control of the lighting time of first even pixel data and second odd pixel data in the one main scanning line period and of the lighting time of first odd pixel data and second even pixel data in the one main scanning line period, it is possible to adjust the image density to be the same as during normal copying (it lights once for even light emitting element and once for odd light emitting element), as well as to thicken the horizontal line by increase in edge density in one line, thereby enabling to improve the aspect ratio of one dot.

Furthermore, the ratio of the lighting time of the first even pixel data and the second even pixel data in the one main scanning line cycle is same as that of the lighting time of the first odd pixel data and the second odd pixel data in the one main scanning line cycle and the control is performed such that the lighting time of the first even pixel data in the one main scanning line cycle is greater than the lighting time of the second even pixel data in the one main scanning line cycle and the lighting time of the first odd pixel data in the one main scanning line cycle is less than the lighting time of the second odd pixel data in the one main scanning line. This enables to adjust the image density to be the same as during the normal copying (it lights once for even light emitting element and once for odd light emitting element) as well as to thicken the horizontal line by increase in the edge density in one line, thereby enabling to improve the aspect ratio of the dot.

Moreover, the image-data-transfer control unit, in a case of a first output mode, performs the image-data transfer control such that the operation of transferring the odd pixel data upon transferring the even pixel data is repeated for a plurality of times while performing the image data transfer for one line in one main scanning line width to each light-emitting-element array. In a case of a second output mode, the image-data transfer control unit performs the image-data transfer control such that the operation of transferring the odd pixel data upon transferring the even pixel data is performed once while performing the image data transfer for one line in one main scanning line width to each light-emitting-element array. This enables to output with fidelity the line image.

Furthermore, according to the present invention, the image-data-transfer control unit, in the case of the first output mode, performs the ratio control of the lighting time of the first even pixel data and the second even pixel data in the one main scanning line cycle and the lighting time of the first odd pixel data and the second odd pixel data in the one main scanning line cycle. This enables to suppress unevenness in density.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image writing apparatus comprising:
a light-emitting-element array unit that includes a plurality of light-emitting-element arrays in which a plurality of light-emitting elements that are controlled based on binary image data are arranged in a row; and
an image-data-transfer control unit that divides image data corresponding to one line in a main scanning direction for each of the light-emitting-element arrays, and when transferring the image data divided to each of the light-emitting-element arrays, controls a transfer of the image data by repeating a process of alternately transferring even pixel data and odd pixel data in one cycle of the one line in the main scanning direction,
wherein the image-data-transfer control unit further controls a first ratio of a first lighting time of first even pixel data to a second lighting time of second even pixel data such that a total lighting time of the first even pixel data and the second even pixel data in the one cycle of the one line in the main scanning direction becomes same for each cycle.

2. The image writing apparatus according to claim 1, wherein the image-data-transfer control unit further controls a second ratio of a third lighting time of first odd pixel data to a fourth lighting time of second odd pixel data such that a total lighting time of the first odd pixel data and the second odd pixel data in the one cycle of the one line in the main scanning direction becomes same for each cycle.

3. The image writing apparatus according to claim 2, wherein the image-data-transfer control unit takes the first ratio to be the same as a reciprocal of the second ratio, and controls the first ratio and the second ratio so that following inequalities are satisfied:

the first lighting time>the second lighting time, and the third lighting time<the fourth lighting time.

4. An image writing apparatus comprising:
a light-emitting-element array unit that includes a plurality of light-emitting-element arrays in which a plurality of light-emitting elements that are controlled based on binary image data are arranged in a row; and
an image-data-transfer control unit that divides image data corresponding to one line in a main scanning direction for each of the light-emitting-element arrays, and when transferring the image data divided to each of the light-emitting-element arrays, controls the transfer of the image data such that,
in a first output mode, by repeating a process of alternately transferring even pixel data and odd pixel data in one cycle of the one line in the main scanning direction, and
in a second output mode, by performing once a process of alternately transferring even pixel data and odd pixel data in one cycle of the one line in the main scanning direction,
wherein, in the first output mode, the image-data-transfer control unit further controls a ratio of a lighting time of first even pixel data to a lighting time of second even pixel data such that a total lighting time of the first even pixel data and the second even pixel data in the one cycle of the one line in the main scanning direction becomes same for each cycle.

5. The image writing apparatus according to claim 4, wherein, in the first output mode, the image-data-transfer control unit further controls a ratio of a lighting time of first odd pixel data to a lighting time of second odd pixel data such that a total lighting time of the first odd pixel data and the second odd pixel data in the one cycle of the one line in the main scanning direction becomes same for each cycle.

* * * * *